United States Patent [19]
Stephens et al.

[11] Patent Number: 5,808,743
[45] Date of Patent: Sep. 15, 1998

[54] LASER SENSOR USING OPTICAL FEEDBACK-INDUCED FREQUENCY MODULATION

[75] Inventors: Michelle S. E. Stephens; Peter A. Roos; Carl E. Wieman; Eric A. Cornell, all of Boulder, Colo.

[73] Assignee: Board of Regents of the University of Colorado, Boulder, Colo.

[21] Appl. No.: 629,361

[22] Filed: Apr. 5, 1996

[51] Int. Cl.[6] .................................................. G01N 11/14
[52] U.S. Cl. ........................................... 356/373; 356/375
[58] Field of Search ............................... 356/432 T, 357, 356/373, 375, 32; 372/75, 69

[56] References Cited

U.S. PATENT DOCUMENTS

| | | | |
|---|---|---|---|
| 3,811,774 | 5/1974 | Honeycutt et al. | 356/28 |
| 3,847,485 | 11/1974 | Zanoni | 356/376 |
| 4,554,836 | 11/1985 | Rudd | 73/657 |
| 4,768,381 | 9/1988 | Sugimoto | 73/657 |
| 5,260,762 | 11/1993 | Telle | 356/5 |
| 5,394,233 | 2/1995 | Wang | 356/5.01 |
| 5,434,668 | 7/1995 | Wootton et al. | 356/345 |
| 5,515,166 | 5/1996 | Mori et al. | 356/345 |
| 5,534,992 | 7/1996 | Takeshima et al. | 356/5.1 |
| 5,594,543 | 1/1997 | De Groot et al. | 356/5.09 |

OTHER PUBLICATIONS

Lang, R. and Kobayashi, K., "External Optical Feedback Effects on Semiconductor Infection Laser Properties," *IEEE J. Quantum Electronics* (1980) QE–16(3):347–355.

Kikuta, H. et al., "Distance measurement by the wavelength shift of laser diode light," *Applied Optics* (Sep. 1986) 25(17):2976–2980.

Webb, D.J. et al., "Interferometric Optical Path Difference Measurement Using Sinusoidal Frequency Modulation of a Diode Laser," *Optics Communications* (May 1988) 66(5, 6):245–248.

Shimizu, E.T., "Directional discrimination in the self–mixing type laser Doppler velocimeter," *Applied Optics* (Nov. 1987) 26(21):4541–4544.

de Groot, P.J. et al., "Ranging and velocimetry signal generation in a backscatter–modulated laser diode," *Applied Optics* (Nov. 1988) 27(21):4475–4480.

Suematsu, M. and Takeda, M., "Wavelength–shift interferometry for distance measurements using the Fourier transform technique for fringe analysis," *Applied Optics* (Oct. 1991) 30(28):4046–4055.

Samuels, M. et al., "Low Cost, Handheld Lidar system for Automotive Speed Detection and Law Enforcement," *SPIE* (1992) 1633:147–159.

De Maria, L. and Martinelli, M., "External frequency modulation of a laser source for non–incremental interferometric measurements," *Meas. Sci. Technol.* (1993) 4:1228–1231.

(List continued on next page.)

*Primary Examiner*—Frank G. Font
*Assistant Examiner*—Zandra V. Smith
*Attorney, Agent, or Firm*—Greenlee, Winner & Sullivan, P.C.

[57] ABSTRACT

This invention provides an inexpensive, sensitive sensor to measure target position, velocity and vibration based on optical feedback-induced fluctuations in the operating frequency of a diode laser. The sensor comprises a diode laser, an optical frequency discriminator to measure the laser operating frequency, and an electronic signal analyzer to obtain the modulation frequency of the laser operating frequency. This invention further includes two calibration mechanisms for vibration amplitude measurement. In a first calibration mechanism the diode laser is mounted on a laser vibrator, which vibrates the laser relative to the target. In a second calibration mechanism a frequency modulator is coupled to the diode laser to modulate the operating frequency.

39 Claims, 8 Drawing Sheets

OTHER PUBLICATIONS

Ryan, R.E. et al., "Two–photon spectroscopy in rubidium with a diode laser," *J. Optical Soc. Am. B* (Sep. 1993) 10(9):1643–1648.

Deng, K.–L. and Wang, J., "Nanometer–resolution distance measurement with a noninterference method," *Applied Optics* (Jan. 1994) 33(1):113–116.

Kato, J. et al., "Optical feedback displacement sensor using a laser diode and its performance improvement," *Meas. Sci. & Tech.* (1995) (6):45–52.

Donati, S. et al., "Laser Diode Feedback Interferometer for Measurement of Displacements without Ambiguity," *IEEE J. Quantum Electronics* (Jan. 1995) 31(1):113–119.

Roos, Peter A., "Laser Vibrometry Using Optical Feedback–Induced Frequency Modulation in Laser Diodes," Ph.D. thesis, Univeristy of Colorado at Boulder, Department of Physics, Apr. 7, 1995.

Erskine, D.J. and Holmes, N.C., "White–light velocimetry," *Nature* (Sep. 1995) 377:317–320.

LASER SENSOR USING OPTICAL FEEDBACK-INDUCED FREQUENCY MODULATION

FIELD OF THE INVENTION

This invention relates to the measurement of vibration, velocity and position by optical feedback-induced frequency modulation of a diode laser.

BACKGROUND OF THE INVENTION

Optical methods have become important tools in the nondestructive evaluation of machines and materials, with applications ranging from robotics to law enforcement. They have been applied to quality assurance, predictive maintenance and acoustic research.

Laser Doppler Velocimetry is the most common technique for remote velocity measurements. A Doppler velocimeter typically consists of a He—Ne laser, a Bragg cell, beam-splitting optics and a photodiode. The beam leaving the laser is split into two beams, one of which is sent through the Bragg cell, which modulates the frequency of the beam, while the other beam is sent to the test surface. The scattered light from the test surface is recombined with the beam modulated by the Bragg cell, creating a beat signal at the photodiode. The Doppler shift in the frequency of the scattered light due to the motion of the test surface causes a shift in the beat frequency which is proportional to the velocity of the surface. Laser Doppler velocimeters are limited by the need for moderately to highly reflective surfaces, and require expensive components such as Bragg modulators.

Laser Feedback Interferometry measures displacement and velocity based on modulations in the output intensity of a diode laser caused by optical feedback from a test surface [P. J. de Groot et al., Appl. Opt. 27, 4475 (1988); S. Donati et al., IEEE J. Quan. Elec. 31, 113 (1995); J. Kato et al. Meas. Sci. and Tech. 6, 45 (1995)]. These measurements require a diode laser and a photodetector to measure the output power of the laser. In some cases the laser is frequency modulated and the phase or beat frequency of the feedback-induced amplitude modulation is analyzed to obtain the test surface position and velocity. As is the case with Doppler Velocimetry, relatively high test surface reflectivity is required.

K-L. Deng et al. [Appl. Opt. 33, 113 (1994)] reflected laser light from a target and measured the feedback-induced shift in operating wavelength using a monochromator. They obtained the target position from the shift in wavelength. Using a superluminescent laser diode the resolution was 20 nm, and with a cw dye laser it was 60 nm. The target was an aluminum coated mirror which reflected 25% of the light back into the laser. The effects of optical feedback on the laser operating frequency depend not only on the position of the object, but also on the backscattered power. Therefore position could only be measured relative to the laser focal point, and a new calibration would be required if the surface reflectivity were changed.

SUMMARY OF THE INVENTION

This invention provides an inexpensive, sensitive sensor to measure target position, velocity and vibration based on optical feedback-induced fluctuations in the operating frequency of a diode laser. By using induced frequency changes as a signal, this sensor takes advantage of the extreme sensitivity of the lasing frequency of laser diodes to optical feedback. The sensor requires less than 0.005% of the incident light to return to the laser. In comparison to laser feedback interferometry measurements using feedback-induced laser intensity changes, the present sensor is approximately a factor of 1000 more sensitive.

The sensor comprises a diode laser which is directed onto a target. The target scatters a small fraction of light back into the laser diode cavity. The optical feedback alters the operating frequency of the laser. A small portion of the light is diverted to an optical frequency discriminator, such as a Fabry-Perot (FP) cavity, where changes in the laser operating frequency are analyzed and an electronic signal is generated which is representative of the laser operating frequency, $\omega$. An electronic signal analyzer obtains the modulation frequency $\omega_f$ of the laser operating frequency $\omega$. From $\omega_f$ the vibration frequency, $\omega_t$, of a vibrating target or the velocity of a moving target can be computed.

This invention further includes two calibration mechanisms for vibration amplitude measurement. For a vibrating target, the amplitude of the frequency component at $\omega_t$, depends not only on the amplitude of vibration, but also on the backscattered power and the distance to the target. In a first calibration mechanism, in order to isolate the effects of target vibration the diode laser is mounted on a laser vibrator, which translates the laser back and forth with a calibrated amplitude and frequency $\omega_L$. The vibration of the laser position relative to the target is equivalent to vibrating the target, and produces a second modulation frequency, $\omega_L$, of the laser operating frequency. Since the amplitude of the laser vibrator motion is known, the amplitude of the target vibration can be obtained from the relative amplitudes of the $\omega_t$ and $\omega_L$ components of the modulation frequency spectrum.

A second calibration mechanism of this invention uses a frequency modulator, electronically coupled with the diode laser, to modulate the unperturbed wavelength by a calibrated amplitude at laser modulation frequency $\omega_\chi$. As with the position modulation calibration mechanism, the frequency modulation produces a second modulation frequency, $\omega_\lambda$, of the laser operating frequency. The amplitude of the target vibration is obtained from the relative amplitudes of the $\omega_t$ and $\omega_\lambda$ components of the modulation frequency spectrum.

To measure the distance to a stationary target, the sensor of this invention uses a frequency modulator coupled with the diode laser. The feedback-induced modulation frequency of the laser operating frequency is proportional to the target distance.

DETAILED DESCRIPTION OF THE INVENTION

Figure 1:
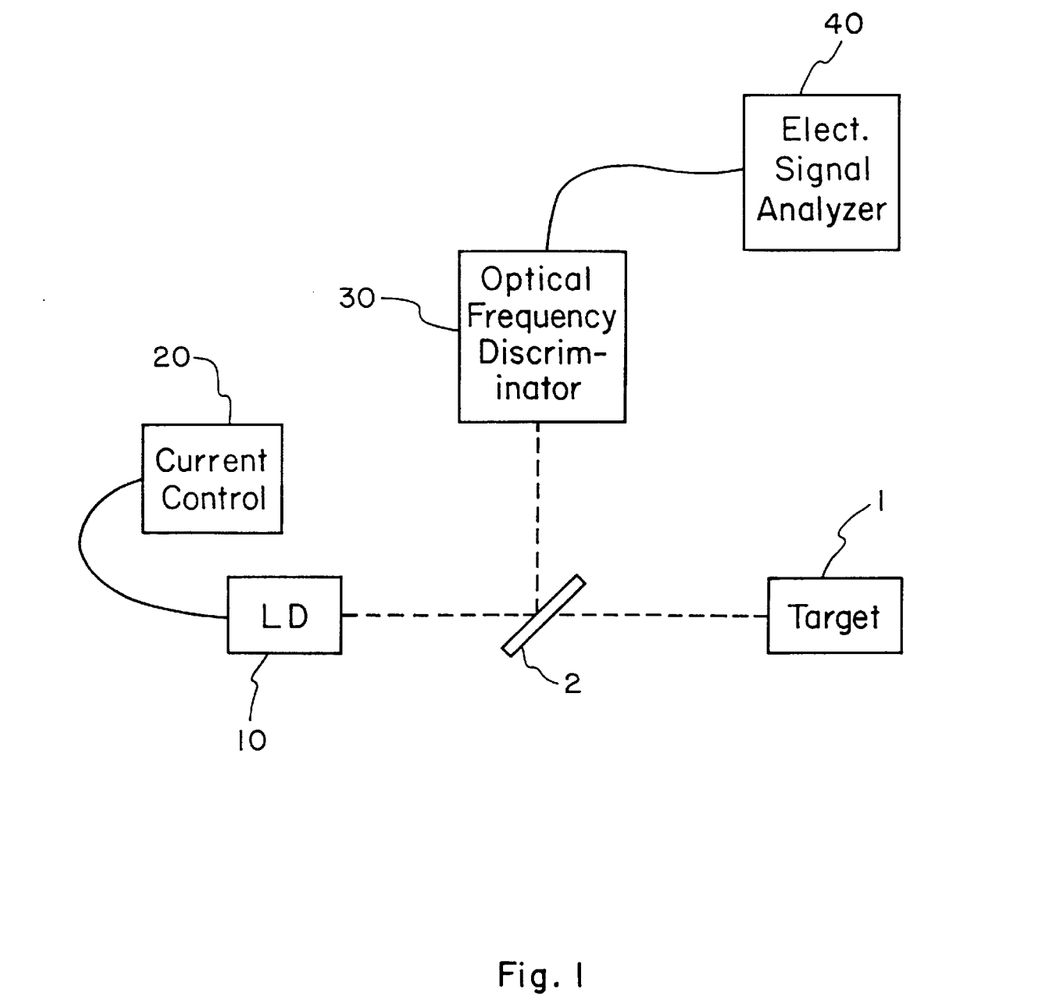
FIG. 1 is a diagram of the sensor comprising a diode laser, frequency discriminator and electronic signal analyzer.

The optical sensor of this invention is illustrated in FIG. 1. Optical connections are illustrated with dashed lines and electrical connections with solid lines. The sensor comprises diode laser 10, optical frequency discriminator 30 and electronic signal analyzer 40. The injection current of the diode laser is supplied by current control 20. The laser output is directed at target 1, which scatters a portion back to the laser. Beamsplitter 2 couples light into the optical frequency discriminator. Alternative couplings can be utilized. For example the optical frequency discriminator can receive light coupled out of the back facet of the laser.

The diode laser can be selected from the many available lasers. The power level and operating wavelength are unimportant in the general design, though they can be optimized for specific applications. The diode laser is operated in a single mode. The current control is preferably a low noise current supply. In some embodiments of this invention current control 20 includes a frequency modulator (FM) which modulates the diode injection current to vary the unperturbed laser operating wavelength. After leaving the diode, the laser light can be collimated with standard optics.

In some embodiments of this invention, diode laser 10 is mounted on a laser vibrator to modulate the distance between the laser and the target. Because of the light weight of the laser, the vibrator can be a piezoelectric transducer (PZT), or it can be any other means for moving the laser with respect to the target. Alternatively, the laser can be fixed in position and the light path between the laser and the target can include a mirror, mounted on a mirror vibrator, to modulate the optical distance between the laser and the target.

The optical frequency discriminator detects the laser's operating frequency as a function of time, either the absolute operating frequency or changes in the operating frequency. The frequency discriminator generates an electronic signal having a time varying magnitude which is representative of the laser operating frequency. Many frequency discriminators are known in the art. In a preferred embodiment, the frequency discriminator is an interferometer, having a transmission which depends on the frequency of light, in combination with a photodetector to measure the transmitted power. Many interferometer designs can be used, one embodiment is a standard two mirror Fabry-Perot (FP) interferometer.

Alternatively, other optical frequency discriminators can be used. In one embodiment the frequency discriminator includes a second, stable, laser (preferably a diode laser) and a photodetector which produces an output which is the difference frequency between the two lasers. Changes in the diode laser frequency produces changes in the difference frequency. In another the frequency discriminator includes an atomic or molecular vapor absorption cell and a photodetector to measure optical transmission. The diode laser wavelength is adjusted so that it is on an absorption line and changes in the diode laser frequency result in a change in the absorption and therefore a change in the optical power at the photodetector.

In order to stabilize the sensitivity of the frequency discriminators described above, it is preferred to control the laser wavelength relative to the frequency discriminator, for example to have it sit on the side of the FP or atomic resonance. The central wavelength is stabilized at low frequencies, and the high frequency modulations in the laser operating frequency (LOF) are measured. The term central wavelength is used herein for a wavelength within the range of the periodic fluctuations of the LOF, not necessarily at the exact center of the range. Central wavelength control can be done by using the frequency discriminator signal as part of a low frequency feedback loop to either the laser current or to the laser temperature. Changing either of these changes the wavelength and can be used to hold the central wavelength at the desired point. Means for controlling the laser temperature and current are known in the art.

Figure 2:
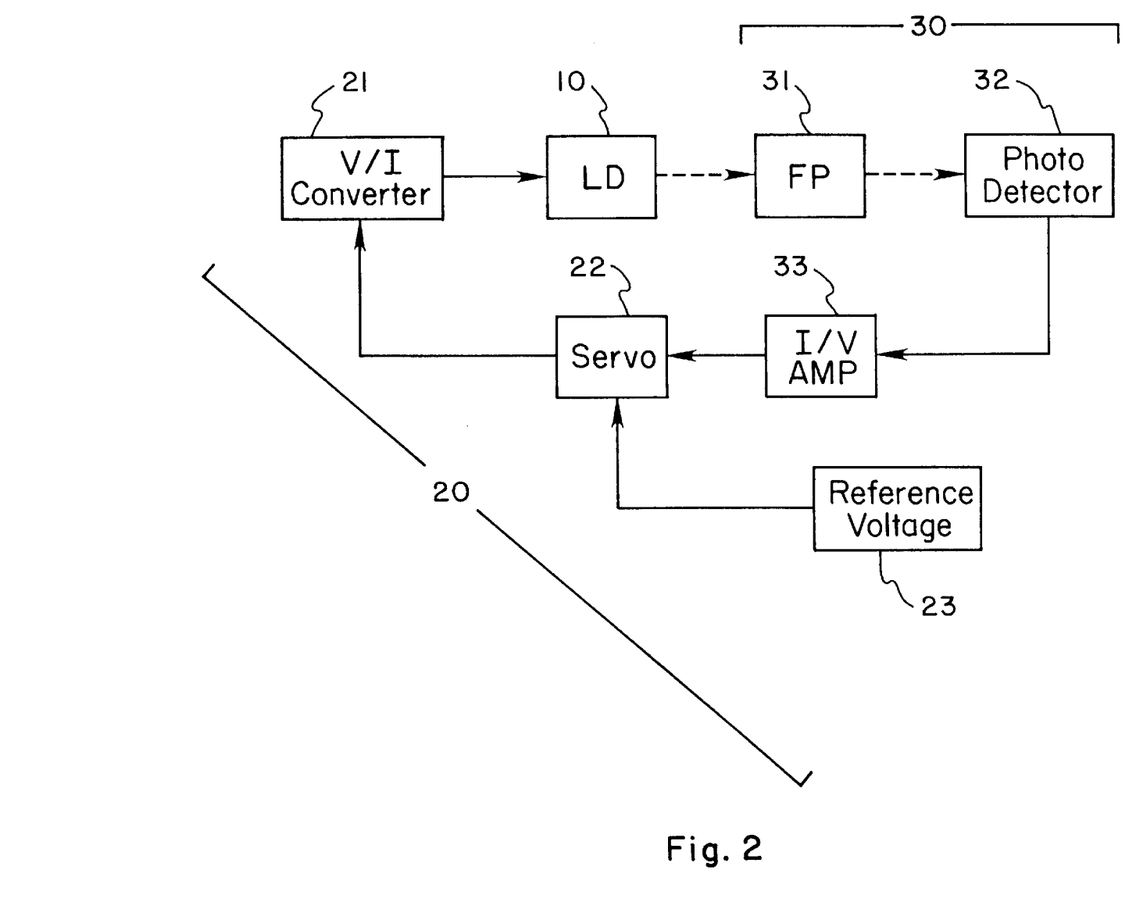
FIG. 2 is a central wavelength controller for a diode laser using a low frequency servo.

A preferred embodiment of the central wavelength controller is illustrated in FIG. 2. Frequency discriminator 30 comprises FP interferometer 31, photodetector 32, and voltage amplifier 33. Current control 20 comprises reference voltage supplier 23, servo circuit 22 and voltage-to-current converter 21. Servo circuit 22 generates an error signal by comparing the frequency discriminator signal from voltage amplifier 33 with a reference signal from reference voltage supplier 23. The reference voltage is set so that the central wavelength is held constant at about half the FP peak transmittance. LOF modulations resulting from target motion are detected as fast modulations (above the servo bandwidth) in the light transmitted through the FP.

In an alternative embodiment, the central wavelength controller stabilizes the central wavelength to a frequency higher than the signal of interest. In this case, the optical frequency discriminator actually encompasses servo circuit 22. The error signal from servo circuit 22, which is input to converter 21, is also input to electronic signal analyzer 40. The modulation frequency of this error signal is the modulation frequency of the LOF. In this embodiment, the central wavelength controller strives to remove fluctuations in the LOF due to both low frequency drift and high frequency signal, and consequently the LOF is approximately stable.

The output of the frequency discriminator is an electronic signal representative of the laser operating frequency. Depending on the frequency discriminator, the signal can be linearly proportional to the LOF or can have a more complex functional dependence. The signal can represent the absolute frequency or the frequency relative to a reference frequency. For example, in the Fabry-Perot interferometer the signal is a function of the difference between the operating frequency and the cavity resonance frequency. The signal depends on the shape of the Fabry-Perot resonance curve and is not linearly related to the frequency difference.

The electronic signal analyzer receives the time domain signal from the frequency discriminator and determines, in the frequency domain, the modulation frequency spectrum (Fourier spectrum) of the laser operating frequency. The modulation frequency spectrum gives the frequencies of changes in the laser operating frequency. Because the term frequency has several meanings in the art, the specific uses are defined as follows. The term modulation frequency $\omega_f$ is used herein for the frequency of a periodic change in the laser operating frequency. The term laser operating frequency $\omega$, or operating frequency, is used herein for the diode laser optical frequency. The term unperturbed frequency $\omega_0$ (wavelength $\lambda_o$) is used for the laser operating frequency (wavelength) in the absence of feedback from the target. The term FM frequency $\omega_\lambda$ is used herein for the frequency of an injection current driven modulation of the unperturbed laser frequency. The term laser vibration frequency $\omega_L$ is used herein for the frequency of motion of the laser vibrator, which changes the laser to target distance. All frequencies are angular frequencies, in radians per second.

Many ways of analyzing the frequency spectrum of an electronic signal are known in the art and can be employed by the electronic signal analyzer of this invention. In an illustrated embodiment a Fourier transform spectrum analyzer is employed to provide rapid analysis of the amplitudes and frequencies all the components of the electronic frequency spectrum. A less expensive electronic signal analyzer uses bandpass filters to separate the frequency components, followed by measuring the amplitude and frequency of the individual sine waves. If the frequency is known, the electronic signal analyzer can be a lock-in amplifier which compares the measured electronic signal with a reference signal of the same frequency. If there is only one modulation frequency, the electronic signal analyzer can be a cycle counter, for example, a zero crossing counter, which determines the modulation frequency but not the amplitude.

From the components of the electronic frequency spectrum, target velocity, vibration, and position can be obtained. In a preferred embodiment an electronic computation means, such as a computer, is utilized for the calculations. The expressions used for computation are derived below.

I. Velocity

When a target is placed in the beam path, an external cavity is formed between the target and the back facet of the laser, altering the gain of the laser. This results in a slight frequency shift of the emitted light. In the case of weak optical feedback (the preferred operating condition of this sensor), the external feedback can be considered a small perturbation to the laser gain.

The effects of weak optical feedback on the LOF are described by the Lang-Kobayashi equations [R. Lang et al., IEEE J. Quan. Elec. QE-16, 347 (1980); R. E. Ryan et al., J. Opt. Soc. Am. B 10, 1643 (1993)] which result in the relation $$\Delta\omega\tau_{ext} = -C \sin [\phi + \omega_0\tau_{ext} + \Delta\omega\tau_{ext}], \qquad (1)$$

where $\omega_0$ is the unperturbed LOF, in the absence of optical feedback, $\Delta\omega$ is the resulting change in the LOF, $\tau_{ext}$ is the round-trip time for photons returning from the target, and $\phi = \tan^{-1} \alpha$, where $\alpha$ is the linewidth enhancement factor [D. Lenstra et al., Proc. SPIE 1376, 245 (1990)], a constant with typical values ranging from 6 to 10. C is given by $$C = \frac{1-R}{\tau_L} \left( \frac{f_{ext}}{R} \right)^{1/2} (1+\alpha^2)^{1/2} \tau_{ext} \qquad (2)$$

where R is the front laser facet reflectance (typically 3% for a commercial, antireflection-coated laser or 30% for an uncoated laser), $\tau_L$ is the round-trip time for photons in the diode laser cavity (typically $10^{-11}$ s), and $f_{ext}$ is the fraction of power reflected back into the laser cavity, which depends on the albedo of and the distance to the target.

Expanding Eq. 1 for small $\Delta\omega$, $$\Delta\omega \approx -\frac{C}{\tau_{ext}} \cos(\phi + \omega_0\tau_{ext}). \qquad (3)$$

The round-trip photon time $\omega_{ext}$ between the laser and the target and the unperturbed LOF $\omega_0$ can be written as $\omega_{ext}=2L/c$ and $\omega_0=2\pi c/\lambda_0$, respectively, where c is the speed of light, L is the distance between the laser and the target, and $\lambda_0$ is the unperturbed wavelength of the laser diode. Since $\phi$ is a constant phase factor it can be set to $-\pi/2$ for simplicity, and Eq. 3 can be written $$\Delta\omega \cong A \sin \left[ \frac{4\pi L}{\lambda_0} \right], \qquad (4)$$

where $A=-(c/2L)C$. If L is large relative to its variation, then the amplitude A is approximately constant and the laser frequency is modulated sinusoidally with changes in L.

This can be used to measure velocity or detect small vibrations. For a simple velocity measurement, when the target moves with a velocity v, the modulation frequency of the LOF is a function of the velocity. If $L=L_0+vt$, then $$\Delta\omega = A \sin \left( \frac{4\pi vt}{\lambda_0} + \gamma \right) \qquad (5)$$

where $\gamma = 4\pi L_0/\lambda_0$ is a constant phase. The velocity can be extracted by measuring the modulation frequency of the LOF and using the expression $\omega_f = 4\pi v/\lambda_0$. For example, with a laser wavelength of 830 nm, a target moving at 1 m/s produces a 2.4 kHz modulation in the operating frequency. This modulation, and hence the velocity, can be accurately determined using a simple counter for the electronic signal analyzer in order to count the cycles in the sine wave of Eq. 5. This technique measures only the magnitude of the velocity normal to the laser and not the sign of the motion.

II. Vibration

The case of detecting vibrations is somewhat more complicated. For a target vibrating at a frequency $\omega_t$ and amplitude $b_t \ll L$, $$L=L_0+b_t \sin (\omega_t t), \qquad (6)$$

where $L_0$ is the initial distance to the target. For small vibrations having $4\pi b_t/\lambda_0 \ll 1$, Eq. 4 can be written $$\Delta\omega \cong \cos(4\pi L_0/\lambda_0)A \frac{4\pi}{\lambda} b_t \sin(\omega_t t) + A\sin(4\pi L_0/\lambda_0). \qquad (7)$$

$\Delta\omega$ varies sinusoidally in time with angular frequency $\omega_t$. Since $L_0$ is constant, the amplitude is $$A_t = A \frac{4\pi}{\lambda_0} b_t \cos(4\pi L_0/\lambda_0). \qquad (8)$$

The target vibration frequency and amplitude can be computed using Eqs. 7 and 8. While the frequency can be reliably obtained, there are two difficulties with obtaining the target vibration amplitude using Eq. 8. First, the amplitude of the LOF modulation depends on the distance $L_0$. When $4\pi L_0/\lambda_0 \sim n\pi/2$, where n is an integer, the LOF modulation is small. On the other hand, when $4\pi L_0/\lambda_0 \sim n\pi$, the signal is maximized. Therefore if the distance $L_0$ drifts by more than $\lambda_0/2$ the signal can vary from its maximum value to zero. Second, the LOF modulation amplitude A depends on both the amplitude of vibration and the amount of light returning to the diode laser. The signal from a target with a small vibration amplitude but large feedback power is indistinguishable from the signal from a target with a large vibration amplitude but small feedback power.

To overcome this problem, the sensor of this invention optionally includes one of the following calibration mechanisms to determine the vibration amplitude independent of the feedback power and drifts in $L_0$. The first uses a laser vibrator to produce physical vibration of the laser with a known amplitude, $b_L$, and frequency of motion, $\omega_L$. The response of the LOF to a vibrating target relative to a stationary laser is identical to the response when the laser vibrates relative to a stationary target. Hence, the laser vibration causes an LOF modulation with an amplitude determined by the feedback power, the distance $L_o$, and a known amplitude of laser vibration. When the target vibrates simultaneously, at a frequency $\omega_t$, an LOF modulation is produced corresponding to the same feedback power and distance $L_0$, but a different and unknown vibration amplitude, $b_t$. The combined modulation of the LOF is $$\Delta\omega \cong \cos(4\pi L_0/\lambda_0)\left[A\frac{4\pi}{\lambda_0}b_t\sin(\omega_t t) + A\frac{4\pi}{\lambda_0}b_L\sin(\omega_L t)\right]. \quad (9)$$

The electronic signal analyzer determines the two modulation frequencies, $\omega_t$, and $\omega_L$, and the amplitudes $A_t$ and $A_L$ of the modulations. The relative amplitude of the two modulations depends only on the corresponding vibration amplitudes $b_t$ and $b_L$. Since the laser vibration amplitude is known, the ratio of the amplitudes can be used to determine the vibration amplitude of the target using $b_t/b_L = A_t/A_L$. Both amplitudes vary with changes in the feedback power and with drift of $L_0$, but their ratio remains constant.

Equation 9 is an approximation. The full expression contains many additional terms, for example at frequencies $(\omega_t - \omega_L)(\omega_t + \omega_L)$, $2\omega_L$ and $3\omega_L$. Each term appears as a peak in the electronic frequency spectrum at its particular frequency. The dominant peaks are at $\omega_t$ and $\omega_L$. The electronic signal analyzer preferably includes a means for selecting the largest peaks in the electronic frequency spectrum.

Figure 3:
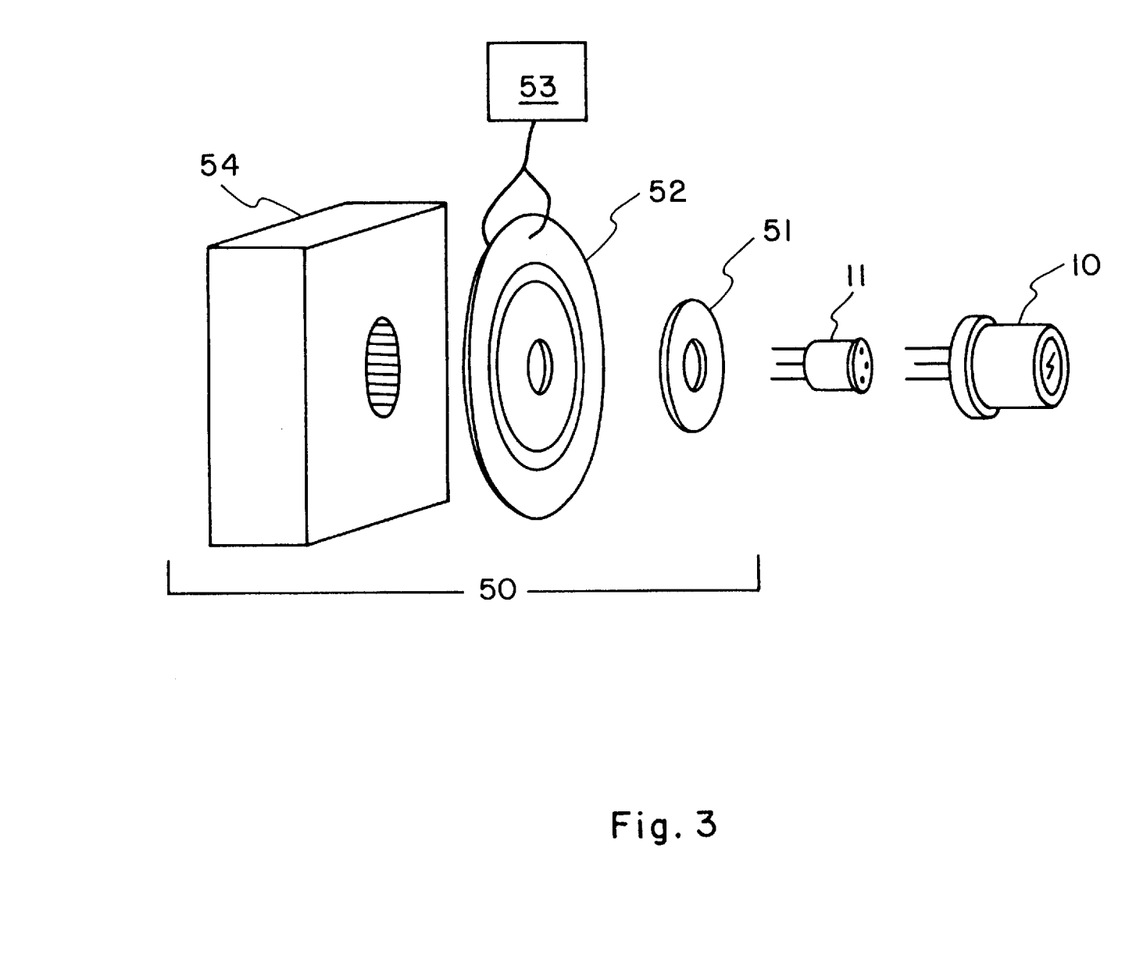
FIG. 3 is a laser vibrator using a PZT.

An embodiment of the laser vibrator is illustrated in exploded view in FIG. 3. Vibrator 50 comprises PZT 52, function generator 53, mounting block 54 and nonconducting washer 51. The PZT has a hole in the center to receive transistor jack 11 and diode laser 10. The PZT is attached to the laser block in a way that allows the PZT to flex, for example with a few epoxy contact points.

A second calibration mechanism of this invention uses the laser current control to frequency modulate the unperturbed laser operating wavelength by a known amount at FM frequency $\omega_\lambda$ $$\lambda = \lambda_0 + \Delta\lambda\sin(\omega_\lambda t), \quad (10)$$

where $\Delta\lambda \ll \lambda_o$. Using Eqs. 10 and 6 in Eq. 4 gives $$\Delta\omega \cong \cos(4\pi L_0/\lambda_0)\left[A\frac{4\pi}{\lambda_o}b_t\sin(\omega_t t) + A\frac{4\pi}{\lambda_o}L_o\frac{\Delta\lambda}{\lambda_o}\sin(\omega_\lambda t)\right]. \quad (11)$$

In the frequency spectrum, the ratio of the peaks at $\omega_t$ and $\omega_\lambda$ is $A_t A_\lambda = b_t \lambda_o/L_o \Delta\lambda$. Thus, in order to obtain $b_t$, the values of $\lambda_o$, $\Delta\lambda$ and $L_o$ are needed. However, even though $b_t$ does depend on $L_o$, which is subject to drifting, it is not a strong $\cos(4\pi L_o/\lambda_o)$ dependence which varies from 0 to 1 over a drift in $L_o$ of $\lambda_o/8$. In this case if $L_o$ is one meter, which is about $10^6\lambda_o$, a drift in $L_o$ of one wavelength corresponds to the difference between $1/10^6\lambda_o$ and $1/(10^6+1)\lambda_o$ in $b_t$, which is insignificant. Either calibration mechanism can be employed to remove the strong sensitivity to feedback power and to distance. In the case of the laser vibrator mechanism data analysis is simpler, but the frequency modulation mechanism can be simpler to construct.

Larger vibrations having amplitude greater than $\lambda_0/2$ correspond to more than one period of the sine wave of Eq. 4. The peak of interest appears in the electronic frequency spectrum at $\omega_t$. However, in this case the amplitude of the motion is extracted simply by counting fringes (and fractions of a fringe) in $\Delta\omega$.

III. Distance

To measure distance to a stationary or very slowly moving target, the unperturbed laser operating wavelength is frequency modulated as described by Eq. 10. From Eqs. 4 and 10 the frequency change for feedback from a stationary object is $$\Delta\omega \cong A\cos(4\pi L_o/\lambda_o)\cos\left[\frac{4\pi L}{\lambda_o + \Delta\lambda\sin\omega_\lambda t}\right]. \quad (12)$$

The distance L can be obtained from the measured $\Delta\omega$ using analysis techniques known in the art. See, for example, the analysis of wavelength shift interferometry [De Maria et al., Meas. Sci. Technol. 4, 1228 (1993); Kikuta et al., Applied Optics 25(17), 2976 (1986); Webb et al., Optics Communications 66(5,6), 245 (1988); Suematsu et al., Applied Optics 30(28), 4046 (1991)]. In one method of analysis, as the laser wavelength is swept in one direction through a half cycle of $\sin\omega_\lambda$), the second cosine term goes through many cycles, and these cycles in $\Delta\omega$ are counted. In a second method, the frequency spectrum is obtained as the wavelength is swept in both directions.

As will be obvious to those skilled in the art, the sensor of this invention can be used to simultaneously measure more than one aspect of the target velocity, vibration and distance. By appropriate laser vibration and/or laser frequency modulation and detailed analysis of the modulation frequency spectrum, target distance and movement can both be determined. For example, to measure both target vibration frequency and average target distance, the laser frequency is modulated at a frequency different from the target vibration frequency. To measure both distance and calibrated vibration amplitude, the sensor can include both a laser vibrator and a laser frequency modulator.

IV. Example 1: Vibrating Target

Figure 4:
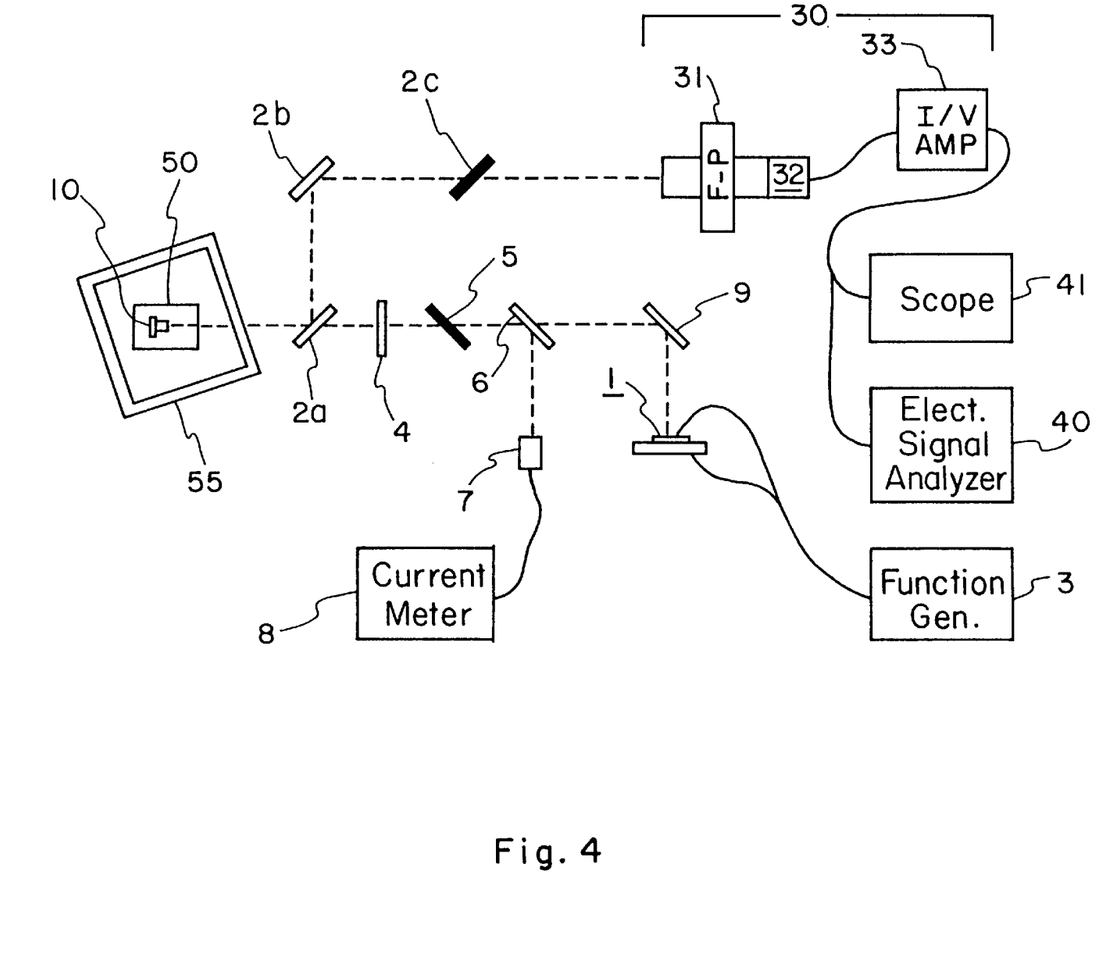
FIG. 4 is the apparatus used for testing the sensor.

A sensor of this invention was used to measure small vibrations of a target. This embodiment of the sensor is shown in FIG. 4. Laser diode 10 was operating with the desired single longitudinal mode at ~775 nm with 85 mA of injection current to produce 5 mW output power. The spectral properties of the unperturbed laser light were verified using an optical spectrum analyzer. The laser was mounted on laser vibrator 50 and the mounted laser was placed in aluminum box 55 to reduce temperature induced changes in the LOF. A hole, sealed with a microscope slide, was drilled at a 20° angle to the normal of the side to allow light to exit the box while minimizing the effects of optical feedback from the slide.

The light from the laser was directed by mirror 9 onto target 1, which was a bimorph PZT connected to function generator 3. The target was 0.8 m from the laser diode (LD). The target surface was a diffusive silver color that scattered light, but gave no specular reflection. The amplitude of the target motion relative to the applied drive voltage was independently calibrated as a function of frequency in a Michelson interferometer. Approximately 4% of the initial laser beam was diverted by glass slide 2a and directed by mirror 2b into frequency discriminator 30. Rotatable $\lambda/2$-plate 4 and polarizing beamsplitter 5 were placed in the beam path to regulate the power reaching the target and therefore the power returning to the laser. A second glass slide, 6, placed after the beamsplitter diverted a small portion of laser light onto PIN photodiode 7, connected to current meter 8. This signal was used to monitor the light reaching the target and was used to estimate the backscattered power returning to the laser. The laser beam was collimated with a collimation lens but was not focussed onto the target. The beam could have been focussed onto the target to increase the sensitivity, but it was not necessary.

The frequency discriminator comprised confocal Fabry-Perot (FP) cavity 31, photodetector 32 and voltage amplifier 33. The FP had a 2 GHz free spectral range and a finesse of 200. A central wavelength controller was used to hold the central value of the laser wavelength constant by locking it to the side of the FP resonance. The unservoed high frequency voltage modulations in the frequency discriminator output were observed on oscilloscope 41 and on electronic signal analyzer 40, which was a Hewlett-Packard spectrum analyzer. The amplitudes of the peaks produced on the spectrum analyzer were representative of the LOF modulation amplitude, and the frequencies of the peaks were equal to LOF modulation frequencies.

To calibrate the motion of the target PZT for an applied drive voltage, a very small mirror was glued to the front surface of the PZT and was used as one mirror in a Michelson interferometer. The target PZT response as a function of driving frequency was measured. Target PZT limitations restricted measurements to frequencies below 50 kHz. The laser vibrator PZT was calibrated similarly.

It was important to minimize the effects of optical feedback from surfaces other than the target. The collimation lens was epoxied to the front of the laser so that the two objects moved together. All optical components were thoroughly cleaned. Attenuator 2c and slight misalignment of the FP, i.e., orienting the FP at a slightly oblique angle, were used to reduce unwanted optical feedback from the FP to a negligible level. An optical isolator between the FP and the laser diode would be a better, but expensive, solution to this problem. Alternatively, by using a larger oblique angle the light could be coupled into an off-axis mode of the cavity.

Figure 5:
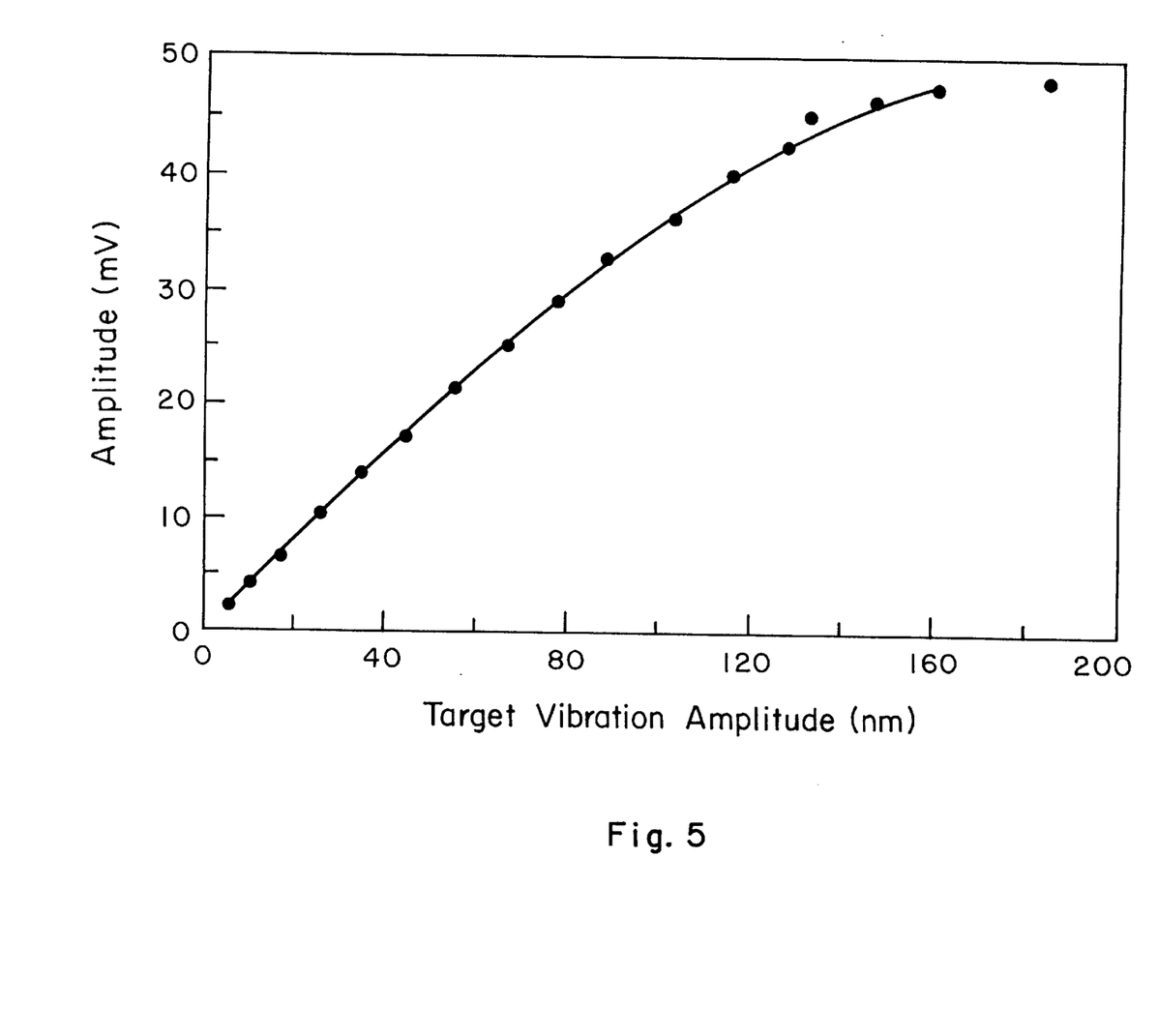
FIG. 5 shows the amplitude of the electronic frequency spectrum peak as a function of peak-to-peak target vibration amplitude for constant $L_0$ and feedback power.

Target vibration was measured first with a stationary laser. The target was vibrated at 35 kHz. The vibration amplitude was varied while the feedback power and $L_0$ were held constant. As expected, the measured frequency spectrum had a peak at 35 kHz. The measured relationship between vibration amplitude of the target and the spectrum analyzer 35 kHz peak is shown in FIG. 5. The circles are the data points; their size represents the measurement uncertainty. The roll-off at larger amplitudes is expected due to the sinusoidal dependence of the signal on vibration amplitude. The dashed line is a normalized plot Eq. 4, with A=49.6, $\lambda_o$=775 nm, and L is one half of the peak-to-peak target vibration amplitude. As predicted by Eq. 4, the sensor signal was maximized for vibrations of ¼ wavelength (195 nm).

Figure 6:
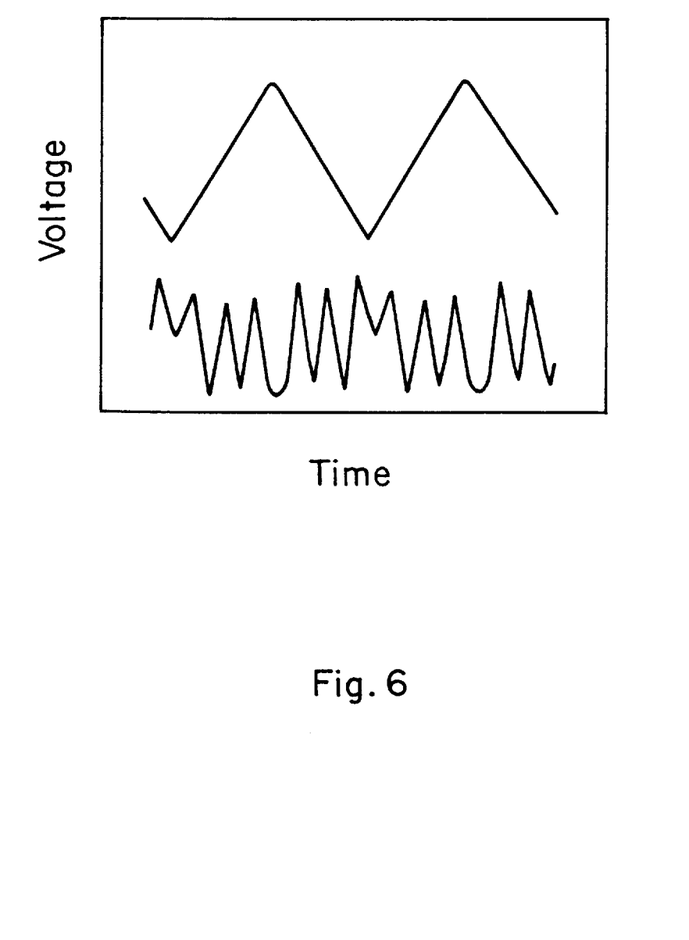
FIG. 6 is the oscilloscope signal while the target was vibrating with an amplitude greater than $\lambda_0/2$. The top trace is the ramp signal sent to the target PZT. The bottom trace is the frequency discriminator signal.

Larger vibrations were observed on the oscilloscope as shown in FIG. 6. The top trace is the voltage sent to the target PZT and the bottom trace is the voltage from the frequency discriminator. A fringe-counting technique is necessary for such measurements. Each fringe represents half of a wavelength of target vibration amplitude.

Figure 7:
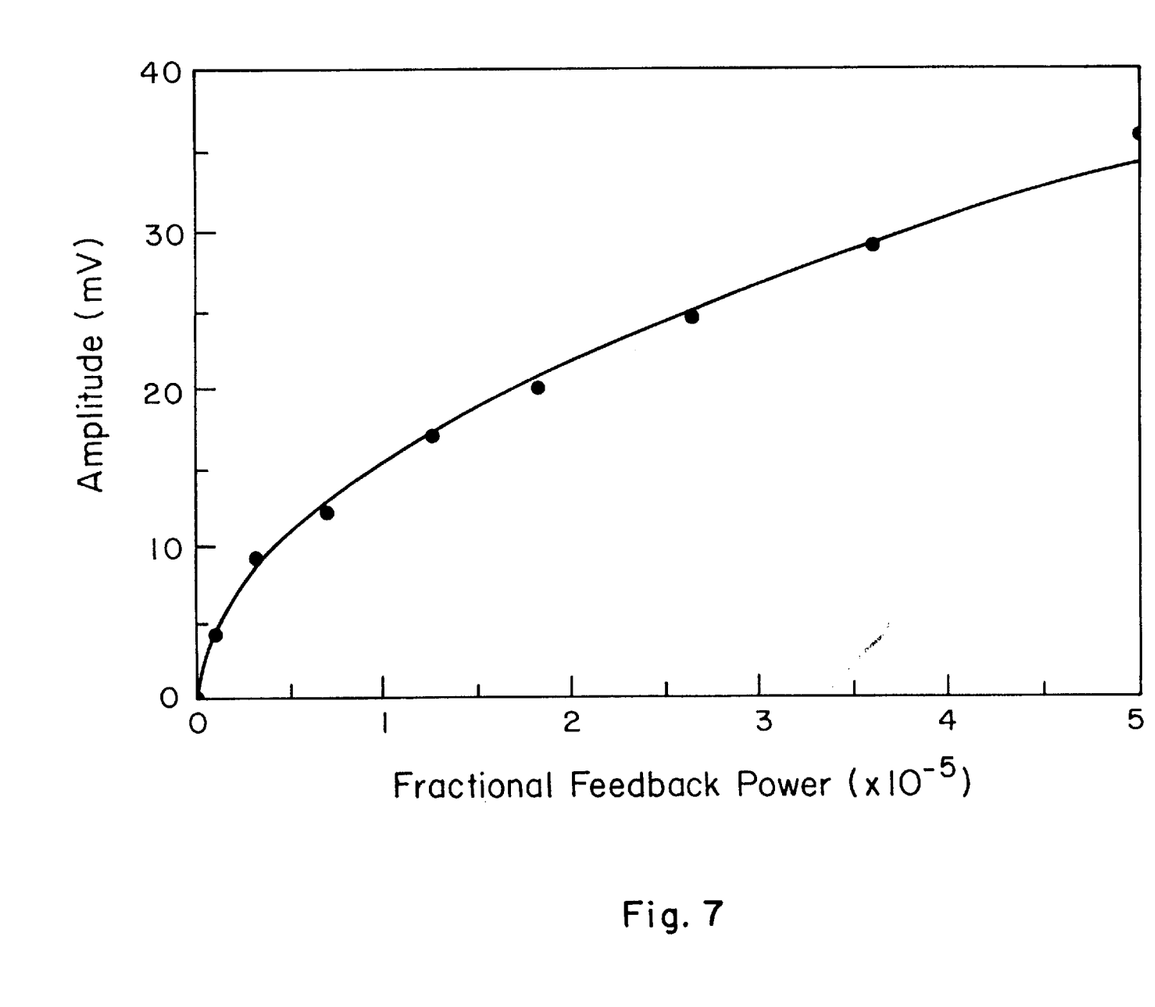
FIG. 7 shows the amplitude of the electronic frequency spectrum peak as a function of feedback power for constant $L_0$ and target vibration amplitude.

The dependence of the electronic frequency spectrum peak on feedback power is shown in FIG. 7. The circles are the data points; their size represents the measurement uncertainty. The dashed line is a normalized plot of Eq. 2, with C equal to 4870 * $f_{ext}^{1/2}$. The maximum feedback power was estimated to be 0.005% of the light incident on the target by measuring the fractional power of scattered light at PIN photodiode 7, positioned 0.2 m from the target, and multiplying that value by the estimated ratio of the solid angle of the diode laser to the solid angle of the PIN photodiode. The rotatable λ/2-plate and the polarizing beamsplitter were then used to change the feedback power below this level. The PIN diode monitored the attenuation. The target vibration amplitude was fixed at 97 nm, and the distance between the laser and the target was held constant by manually adjusting the DC voltage to the target PZT (to compensate for slow, temperature-induced drifts in $L_0$). As expected, the amplitude of the frequency spectrum peak is sensitive to the feedback power.

V. Example 2: Vibration Calibration

Calibration of the amplitude of target vibration was performed using a laser vibrator, as shown in FIG. 3. In this embodiment a 6 mm hole was drilled in the center of PZT disk 52 using a carbide bit. Lightweight wires were soldered to each side of the PZT. The nonconductive washer and transistor jack were epoxied to the outer surface of the PZT, with the leads of the transistor jack protruding through the hole and out the back of the PZT. This assembly was epoxied to the laser mounting block at four isolated points to allow the PZT to flex. The injection current wires soldered to the transistor jack were insulated to ensure no electrical conduction with the PZT. The LD was then fitted into the compatible transistor jack.

Figure 8:
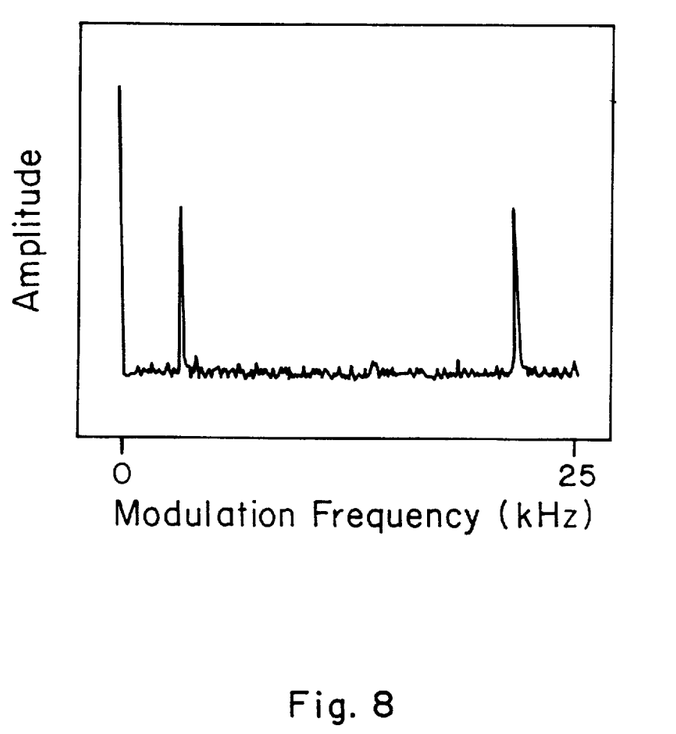
FIG. 8 shows calibration and target peaks on a spectrum analyzer. The laser was vibrated at 6.4 kHz with an amplitude of 97 nm and the target was vibrated at 19.4 kHz with the same amplitude.

The laser was vibrated at 6.4 kHz with amplitude 97 nm and the target vibrated at 19.4 kHz with the same amplitude. FIG. 8 shows a typical spectrum analyzer signal. In this case the laser and target vibration amplitudes are the same and, as expected, the frequency spectrum peaks have the same amplitude. An unknown target vibration amplitude can be determined from the known laser vibration amplitude and the ratio of the target vibration peak to the laser vibration peak.

Repeatability of the peak ratios was examined while separately varying vibration amplitude, feedback power, and $L_o$. To measure varying vibration amplitude, the vibration amplitudes of both the target and laser were changed, but their ratio was kept close to unity. Vibration amplitudes up to 155 nm were observed. The frequency spectrum peak amplitudes varied appropriately with changes in the target vibration amplitude. For fixed vibration amplitude, the feedback power and $L_o$ were each varied and for each set of operating conditions several measurements were averaged. As expected, the calibration eliminates sensitivity to drifts in $L_o$ and to changes in feedback power.

To check the accuracy of the measurements, the number of averages performed by the spectrum analyzer to obtain each ratio was varied. When the vibration amplitude or feedback power was varied, the standard deviation of the ratios decreased as the inverse square root of the number of averages, as expected from random noise fluctuations. However, variations beyond those expected from random noise were obtained for different values of $L_0$. A closer analysis revealed that the noise of the sensor changed when drifts in $L_0$ were larger than $\lambda_o/2$. This increased noise appears to be connected with spurious optical feedback from the FP cavity. To reduce this an optical isolator can be placed between the laser and the frequency discriminator.

VI. Sensor Range

The results show that this instrument can be used to measure small vibrations in solid materials with extremely low feedback while maintaining high sensitivity. Flexibility with respect to the returning light power needed for measurement makes this sensor unique. Movements as small as a few tenths of nanometers were detected with less than 0.005% of the incident power returning to the laser. This means that it is possible to measure small vibrations of targets that have extremely low albedo. Alternatively, the diode sensor is able to be positioned far from the target being measured.

The minimum feedback power needed depends on the vibration amplitude to be measured. The fundamental limit to any vibration measurement is the intrinsic laser frequency noise. The power spectrum of the intrinsic noise increases with decreasing frequency out to ~10 MHz. Therefore, the ultimate sensitivity of a sensor limited by the laser frequency noise is higher at high frequencies away from the relaxation oscillations (near 2 GHz).

The sensor's inherent bandwidth is very large. For the embodiment wherein the frequency discriminator has a central wavelength controller, the range is limited at low frequencies by the servo bandwidth. While the bandwidth of the servo in the illustrated embodiment was about 3 kHz, this limit was not optimized and the limit is preferably less than 100 Hz. The trade-off is low frequency sensitivity of the sensor versus robustness of the lock to the FP; more robust locking methods are known in the art and can be employed. The upper limit of vibration frequency in the illustrated embodiment was ~50 kHz and was completely limited by the response of the target PZT. A diode laser's response to optical feedback is much faster, on the order of 1 ns, and is the fundamental limiting factor for high frequency measurements. If the frequency discriminator is a FP interferometer, the analysis of the signal at frequencies greater than the FP cavity linewidth will be complicated by the change in the response of the cavity, since the cavity will act as a phase, rather than a frequency, discriminator.

An increase in signal can be obtained by increasing the feedback power. At high feedback power, the LOF fluctuations can no longer be approximated by the Lang-Kobayashi equations. Within this limit, however, there are several ways to increase the feedback power and therefore increase the signal. To dramatically increase feedback power, the beam can be focussed onto the target using a lens or other focussing means known in the art. Targets with higher albedo and targets which are closer to the laser have increased the signal.

The sensitivity can also be increased by using a dielectric coating to adjust the reflectance of the front facet of the diode laser, as can be seen from Eqs. 1 and 2. The properties of the FP cavity used as in the frequency discriminator (finesse and free spectral range) also affect the sensitivity and can be optimized for a particular application.

We claim:

1. A sensor for measuring a target comprising:
   a diode laser having an unperturbed wavelength $\lambda_o$ and a laser operating frequency $\omega$, said frequency $\omega$ subject to perturbation by optical feedback from the target;
   an optical frequency discriminator, optically coupled with said diode laser, for generating an electronic signal representative of $\omega$;
   an electronic signal analyzer for receiving said electronic signal and for determining a first modulation frequency $\omega_f$ of said laser operating frequency $\omega$; and
   a laser vibrator, mechanically coupled with said diode laser, for vibrating said diode laser at laser vibration frequency $\omega_L$ with vibration amplitude $b_L$.

2. The sensor of claim 1 wherein said electronic signal analyzer further determines $A_L$, the amplitude of modulation at said frequency $\omega_L$.

3. The sensor of claim 2 for use with a target vibrating at frequency $\omega_t$ with vibration amplitude $b_t$, wherein said electronic signal analyzer further determines $A_t$, the amplitude of modulation at said frequency $\omega_t$.

4. The sensor of claim 3 further comprising an electronic computation means coupled to said electronic signal analyzer for computing said amplitude $b_t$ according to the relation $b_t/b_L=A_t/A_L$.

5. The sensor of claim 2 wherein said vibration amplitude $b_L$ is approximately equal to $b_t$.

6. The sensor of claim 1 wherein said laser vibrator comprises a piezoelectric transducer.

7. The sensor of claim 1 wherein said electronic signal analyzer further determines a second modulation frequency of said laser operating frequency.

8. The sensor of claim 7 wherein said electronic signal analyzer further determines the amplitudes of modulation at said first and second modulation frequencies.

9. The sensor of claim 1 wherein said electronic signal analyzer comprises a Fourier transform spectrum analyzer.

10. The sensor of claim 1 wherein said electronic signal analyzer comprises a bandpass filter.

11. The sensor of claim 1 wherein said electronic signal analyzer comprises a cycle counter.

12. The sensor of claim 1 wherein said diode laser is a single mode diode laser.

13. The sensor of claim 1 further comprising means for controlling the temperature of said diode laser.

14. The sensor of claim 1 further including means for focussing said diode laser.

15. The sensor of claim 1 further including a central wavelength controller coupled with said optical frequency discriminator and with said diode laser.

16. The sensor of claim 15 wherein said central wavelength controller comprises a servo for comparing said electronic signal representative of $\omega$ with a reference electronic signal and generating an error signal therefrom.

17. The sensor of claim 16 wherein said error signal is used to control the injection current of said diode laser.

18. The sensor of claim 15 wherein the bandwidth of said central wavelength controller is less than $\omega_f$.

19. The sensor of claim 15 wherein the bandwidth of said central wavelength controller is greater than $\omega_f$.

20. The sensor of claim 16 wherein the bandwidth of said central wavelength controller is greater than $\omega_f$ and wherein said error signal is input to said electronic signal analyzer.

21. The sensor of claim 1 wherein said optical frequency discriminator comprises an interferometer and a photodetector.

22. The sensor of claim 1 wherein said optical frequency discriminator comprises a vapor absorption cell and a photodetector.

23. The sensor of claim 1 wherein said optical frequency discriminator comprises a second diode laser and a photodetector.

24. The sensor of claim 1 further including a beamsplitter for optically coupling said diode laser with said optical frequency discriminator.

25. The sensor of claim 1 wherein said optical frequency discriminator is optically coupled with said diode laser through the back facet of said diode laser.

26. The sensor of claim 1 further including a means for reducing optical feedback from said optical frequency discriminator to said diode laser.

27. The sensor of claim 26 wherein said means for reducing feedback comprises an optical isolator positioned between said optical frequency discriminator and said diode laser.

28. The sensor of claim 26 wherein said means for reducing feedback comprises an attenuator positioned between said optical frequency discriminator and said diode laser.

29. The sensor of claim 26 wherein said means for reducing feedback comprises coupling light into said optical frequency discriminator at an oblique angle.

30. The sensor of claim 1 for measuring a target moving at velocity v, further comprising
   an electronic computation means coupled to said electronic signal analyzer for computing said velocity v from $\omega_f$ according to the relation $\omega_f=4\pi v/\lambda_o$.

31. A sensor for measuring a target comprising:
   a diode laser having an unperturbed wavelength $\lambda_o$ and a laser operating frequency $\omega$, said frequency $\omega$ subject to perturbation by optical feedback from the target;
   an optical frequency discriminator, optically coupled with said diode laser, for generating an electronic signal representative of $\omega$;

an electronic signal analyzer for receiving said electronic signal and for determining a first modulation frequency $\omega_f$ of said laser operating frequency $\omega$; and a mirror for reflecting light from said diode laser to said target, and a mirror vibrator, mechanically coupled with said mirror, for vibrating said mirror.

32. The sensor of claim 31 wherein said mirror vibrator comprises a piezoelectric transducer.

33. A sensor for use with a target vibrating at frequency $\omega$ with vibration amplitude $b_t$, comprising:

a diode laser having an unperturbed wavelength $\lambda_o$ and a laser operating frequency $\omega$, said frequency $\omega$ subject to perturbation by optical feedback from the target;

an optical frequency discriminator, optically coupled with said diode laser, for generating an electronic signal representative of $\omega$;

an electronic signal analyzer for receiving said electronic signal and for determining a first modulation frequency $\omega_f$ of said laser operating frequency $\omega$, and for determining $A_\lambda$, the amplitude of modulation at said frequency $\omega_\lambda$, and for further determining $A_t$, the amplitude of modulation at said frequency $\omega_t$; and a laser frequency modulator, electronically coupled with said diode laser, for modulating the laser wavelength at frequency $\omega_\lambda$ with modulation amplitude $\Delta\lambda$.

34. The sensor of claim 33 further comprising an electronic computation means coupled to said electronic signal analyzer for computing said amplitude $b_t$ according to the relation $A_t/A_\lambda = b_t\lambda_0/L_0\Delta\lambda$.

35. A sensor for measuring a target, comprising:

a diode laser having an unperturbed wavelength $\lambda_o$ and a laser operating frequency $\omega$, said frequency $\omega$ subject to perturbation by optical feedback from the target;

an optical frequency discriminator, optically coupled with said diode laser, for generating an electronic signal representative of $\omega$;

an electronic signal analyzer for receiving said electronic signal and for determining a first modulation frequency $\omega_f$ of said laser operating frequency $\omega$;

a laser frequency modulator, electronically coupled with said diode laser, for modulating the laser wavelength at frequency $\omega_\lambda$ with modulation amplitude $\Delta\lambda$; and a laser vibrator, mechanically coupled with said diode laser, for vibrating said diode laser at laser vibration frequency $\omega_L$ with vibration amplitude $b_L$.

36. A sensor for measuring a target vibrating at frequency $\omega_t$ with vibration amplitude $b_t$, comprising:

a diode laser having an unperturbed wavelength $\lambda_0$ and a laser operating frequency $\omega$, said frequency $\omega$ subject to perturbation by optical feedback from the target;

an optical frequency discriminator, optically coupled with said diode laser, for generating an electronic signal representative of $\omega$;

an electronic signal analyzer for receiving said electronic signal and for determining a first modulation frequency $\omega_f$ of said laser operating frequency $\omega$; and a means for obtaining $\omega_t$ from $\omega_f$ according to the relation $\omega_f = \omega_t$.

37. The sensor of claim 36 wherein said electronic signal analyzer further determines $A_t$, the amplitude of modulation at said modulation frequency $\omega_f$, and wherein said sensor further comprises an electronic computation means coupled to said electronic signal analyzer for computing said amplitude $b_t$ from $A_t$ according to the relation $b_t = C'A_t$, where $C'$ is a constant.

38. A method of using the sensor of claim 36 to measure the vibration frequency $\omega_t$ of a vibrating target, comprising the steps of:

impinging light from said diode laser on the target;

using said optical frequency discriminator to generate an electronic signal representative of $\omega$;

using said electronic signal analyzer to determine a first modulation frequency $\omega_f$ of said laser operating frequency $\omega$; and obtaining $\omega_t$ according to the relation $\omega_f = \omega_t$.

39. A method of measuring the vibration frequency $\omega_t$ of a vibrating target, comprising the steps of:

impinging light from a diode laser on the target, said diode laser having a laser operating frequency $\omega$, said frequency $\omega$ subject to perturbation by optical feedback from the target;

using an optical frequency discriminator, optically coupled with said diode laser, to generate an electronic signal representative of $\omega$;

using an electronic signal analyzer to receive said electronic signal and to determine a first modulation frequency $\omega_f$ of said laser operating frequency $\omega$; and obtaining $\omega_t$ according to the relation $\omega_f = \omega_t$.

* * * * *